Jan. 3, 1967 D. R. VON RECKLINGHAUSEN 3,296,379

MONOPHONIC-STEREOPHONIC AUTOMATIC SWITCHING CIRCUIT

Filed June 18, 1964 2 Sheets-Sheet 1

INVENTOR
DANIEL R. von RECKLINGHAUSEN

BY Rines and Rines

ATTORNEYS

Jan. 3, 1967 D. R. VON RECKLINGHAUSEN 3,296,379

MONOPHONIC-STEREOPHONIC AUTOMATIC SWITCHING CIRCUIT

Filed June 18, 1964 2 Sheets-Sheet 2

INVENTOR

DANIEL R. vonRECKLINGHAUSEN

BY *Rines and Rines*

ATTORNEYS

United States Patent Office 3,296,379 Patented Jan. 3, 1967

3,296,379
MONOPHONIC-STEREOPHONIC AUTOMATIC SWITCHING CIRCUIT

Daniel R. von Recklinghausen, Arlington, Mass., assignor to H. H. Scott, Inc., Maynard, Mass., a corporation of Massachusetts Filed June 18, 1964, Ser. No. 376,035
7 Claims. (Cl. 179—15)

Figure 1:
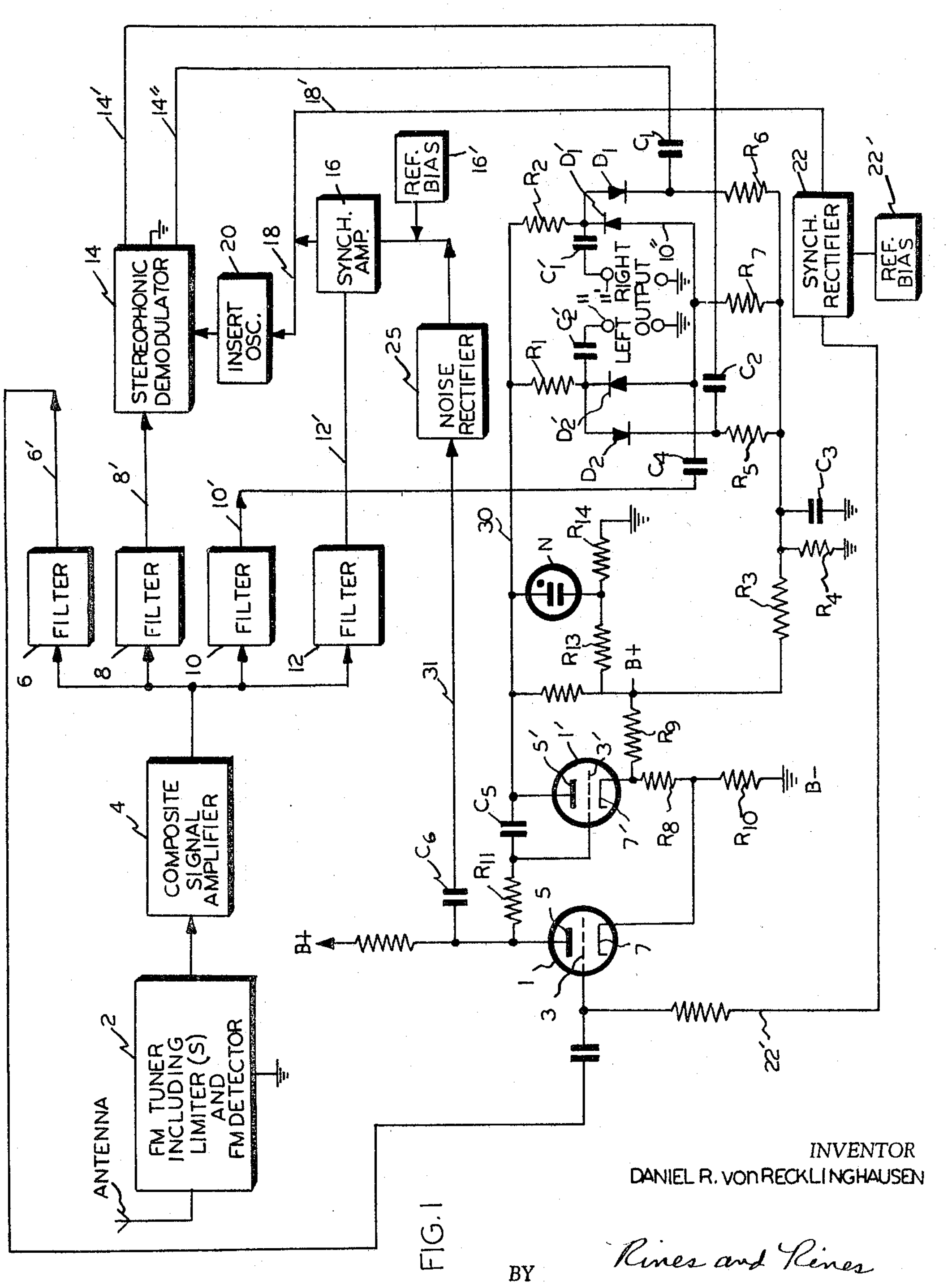

The present invention relates to monophonic stereophonic switching circuits and more particularly to improved circuits for automatically enabling common pairs of output terminals to be connected to left and right stereo output terminals carrying received stereophonic radio broadcast signals and alternately to monophonic output terminals carrying received monophonic signals, during the tuning of an FM receiver to broadcasting station transmissions.

While circuits previously evolved for performing the above function have been successfully employed, they have been subject to several disadvantages. In the first place, though a stereophonic FM receiving system can be operated with the stereo demodulating circuits connected at all times to receive stereo broadcast transmissions, the reception in the case of weak stations transmitting monophonic signals is unnecessarily noisy. In addition, beat frequency whistles often occur when the monophonic broadcasting station is also broadcasting background music in the stereo subcarrier range. The art, therefore, has preferred to provide an automatic means for switching between monophonic and stereophonic reception in the tuner apparatus. It is to be recognized that all the output terminal pairs may operate in an unbalanced connection whereby one lead of each output pair is grounded thereby obviating the switching connection for the grounded leads. Relays have been employed for this switching purpose but they are subject to several disadvantages including their expense, the sharp electrical transients created by contact closure, the mechanical noises involved in the opening and closing of the contacts, and the relatively long time constant of action of the relays which will not permit functioning of the same if tuning is changed rapidly. Resort has principally been had, therefore, to two pairs of diodes that alternately conduct in opposite directions to switch common pairs of output terminals to either the single monophonic output or the two stereo outputs under the control of the relay, subject to the above-described disadvantages, or under the control of a linear direct current amplifier. One of the disadvantages in the use of a conventional direct current amplifier, however, resides in the fact that its input signal may be such that the output of the amplifier provides insufficient bias voltage in one direction or the other for the switching of the diodes. This causes distortion because the signal level in either voltage or current may exceed the reverse voltage provided by the switching circuit to the opposite diode of the pair of switching diodes.

An object of the present invention, accordingly, is to provide a new and improved circuit of the above-described character that obviates the necessity for relays and that overcomes the disadvantages of prior-art direct-current amplifier control of such switching diodes. In summary, this novel result is attained by the utilization of a trigger circuit that exerts a positive control on the biasing of the switching diodes without any possibility of any in-between or insufficient bias voltage and bias current being applied thereto that may introduce the above-described distortion.

A further object of the invention is to provide a novel monophonic-stereophonic automatic searching and switching system.

An additional object is to provide a novel switching circuit of the above-described character that is also of more general utility than in the specific illustration of switching between monophonic and stereophonic outputs; though, for purposes of illustration, the invention will be described as applied to this preferred application.

Other and further objects will be explained hereinafter and will be more particularly pointed out in the appended claims.

Figure 2:
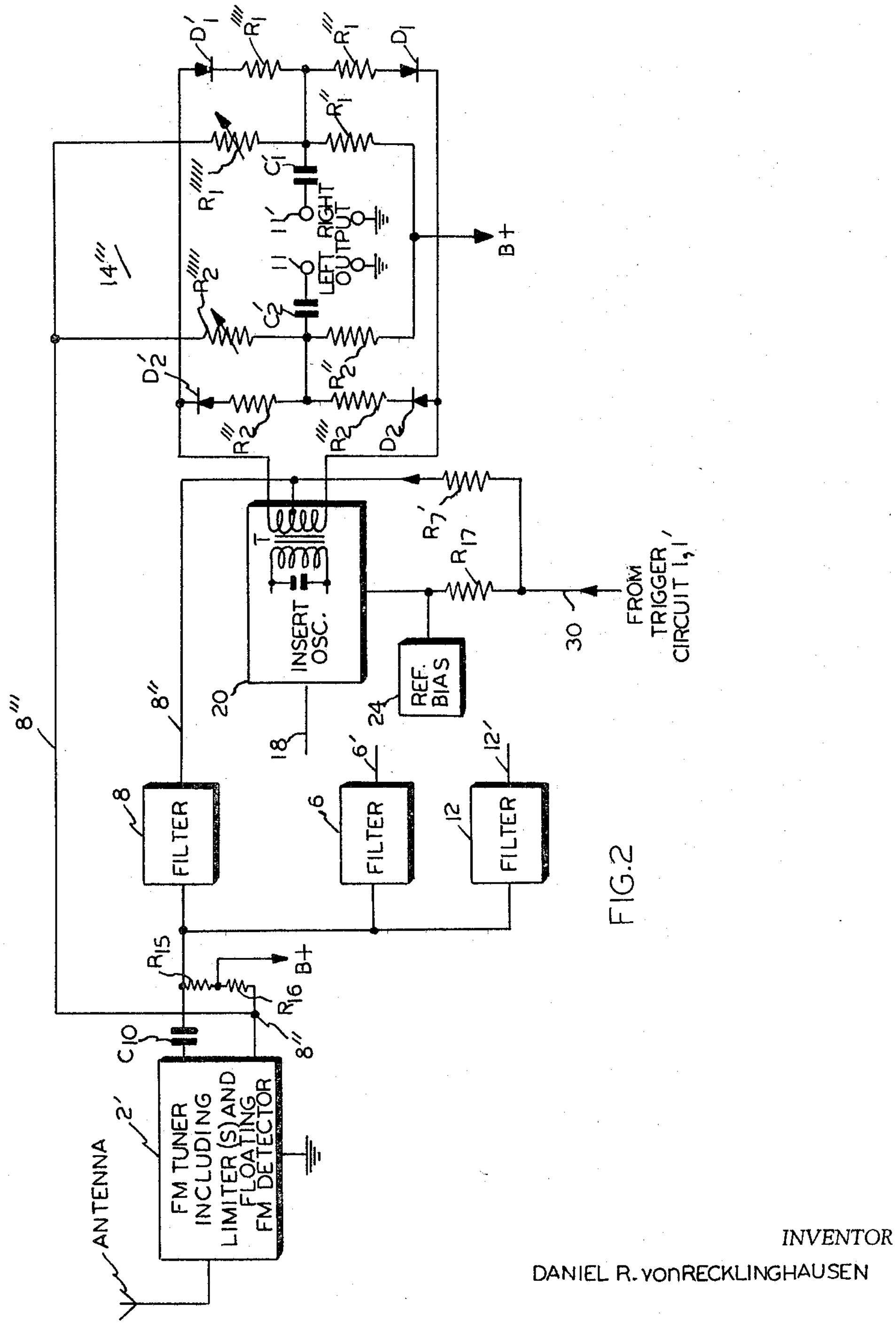

The invention will now be described in connection with the accompanying drawing:

FIG. 1 of which is a combined block and schematic circuit diagram illustrating the invention in preferred form; and FIG. 2 is a fragmentary circuit diagram of a modification.

Referring to FIG. 1, a conventional FM tuner including one or more limiters and an FM detector is shown at 2, receiving signals from an antenna or other source, and applying the detected output preferably, though not essentially, through a composite signal amplifier 4 to a plurality of filters 6, 8, 10 and 12. These filters are respectively tuned to filter out the following: noise above all broadcast modulation frequencies (with, for example, a 75 kc. high-pass filter 6); composite stereophonic program signals (as with the aid of a 50 c.p.s. to 53 kc. filter 8); monophonic program signals (as with a 50 c.p.s. to 15 kc. filter 10); and the stereophonic broadcast 19 kc. synchronization pilot signal (with a pilot tone filter 12). The stereophonic broadcast signals will in this instance be of the type described, for example, in my article entitled "Stereophonic FM-Receivers and Adaptors" appearing in the Institute of Radio Engineers Transactions on Broadcast and Television Receivers, BTR7, No. 3, November 1961, involving the modulation of a monophonic signal representative of the sum of the left and right channel signals, a 38 kc. double side band suppressed carrier amplitude modulated signal serving as a subcarrier and in turn modulated by the difference between the left and right channel signals, and the before-mentioned 19 kc. synchronizing pilot signal.

The output of the noise filter 6 is shown connected by conductor 6' to the input or control electrode 3 of a normally conducting left-hand stage 1 of a trigger circuit hereinafter described. In the case of a proper signal transmission from a broadcast station, the output of the filter 6 will be zero, so that no input is applied to alter the operation of the normally conducting stage 1. In the event that monophonic transmissions are received in the tuner 2, there will be an output of the filter 8 that is applied at 8' to a stereophonic demodulator 14 of any conventional type, such as that described in my said article. There will then result a monophonic output in both the right and left stereo outputs 14'' and 14' of the stereophonic demodulator 14. These outputs are respectively applied through coupling capacitors $C_1$ and $C_2$ to diodes $D_1$ and $D_2$, reverse-biased so that the diodes are then nonconductive, by the voltage existing at the anode 5' of the other stage 1' of the before-mentioned trigger circuit, as applied through resistors $R_2$ and $R_1$. The bias is determined by the reference bias circuit comprising resistors $R_3$ and $R_4$ (by-passed at $C_3$), resistor $R_3$ being connected between the B+ terminal supplying plate voltage to the anodes 5 and 5' of the trigger tubes 1 and 1', and through further resistors $R_6$ and $R_5$ to the respective junctions of coupling capacitors $C_1$ and $C_2$ and the diodes $D_1$ and $D_2$.

Though the monophonic station may also be broadcasting background frequency-modulated music signals, as before mentioned, in the range of, say 23 to 53 kc., which may be transformed into an audible whistle by the demodulating action of the stereophonic demodulator 14, such audible whistle will not pass through the diodes $D_1$ and $D_2$ in view of their reverse-biased non-conductive state and thus will not pass through coupling capacitors $C_2'$ and $C_1'$ to the respective pairs of output terminals 11 and 11' of the receiving system.

Continuing with the case of monophonic transmissions, the filter 10 will pass the monophonic program signal along conductor 10' through a coupling capacitor $C_4$ to a further diode $D_2'$ which is poled reversely to the poling of diode $D_2$ and thus is properly biased to conduct through resistor $R_1$ on one side and through resistor $R_7$ on the other. This feeds a signal through capacitor $C_2'$ to the left-hand pair or output terminals 11. Similarly, the output of filter 10 is fed through coupling capacitor $C_4$ by way of conductor 10'' to an additional diode $D_1'$ which is reversely poled with respect to the diode $D_1$ and thus conducts as a result of the bias provided by resistors $R_2$ and $R_7$, supplying the same monophonic output through coupling capacitor $C_1'$ to the righthand output terminal pair 11'.

There will be no output from the 19 kc. pilot tone filter 12 in the case of these monophonic transmissions so that no output is produced by the synchronizing amplifier 16 connected thereto by conductor 12'. The synchronizing output of amplifier 16, when operative, is shown applied by conductor 18 to a 38 kc. insert oscillator 20 that is usually associated with the stereophonic demodulator 14, as described in my said article. The amplifier 16 is also shown connected by conductor 18' to a synchronization rectifier 22 which, in the case of no output from the filter 12, applies no modifying bias voltage to the control electrode 3 of the left-hand trigger tube 1. The tube 1 thus remains conductive, as before explained, and the second stage 1' will be in the fully conductive or saturated condition as a result of the bias applied from the following interconnections with stage 1. The cathode 7' of the tube 1' is connected through resistor $R_8$ to the cathode of stage 1, and through resistor $R_9$ to the B+ terminal and through resistors $R_8$ and $R_{10}$ to the B− or ground terminal, providing positive feedback between the stages 1' and 1. The plate 5 of the stage 1 is also coupled by resistor $R_{11}$ to the control or input electrode 3' of the stage 1', and a feedback capacitor $C_5$ is connected between resistor $R_{11}$ and the plate or anode 5' of the stage 1', providing the appropriate time constant for the switching action when the tube 1', as hereinafter described, is rendered completely non-conductive upon the receipt of a stereophonic signal. Clearly, however, other well-known coupled-stage trigger circuits, selectively operated upon monophonic and stereophonic signal reception may be employed, though the above-described type is preferred.

Thus, in summary, when a monophonic transmission occurs, the monophonic signal is automatically applied to both the left and right output terminals 11 and 11' of the apparatus and, in effect, the stereophonic portion of the circuit is rendered ineffectual.

When, however, the station is transmitting a stereophonic program signal, this is identified by an output from the pilot-tone filter 12 which activates the synchronizing amplifier 16 and thus synchronizes the action of the 38 kc. insert oscillator 20 and further applies an output voltage by way of conductor 18' to the synchronizing rectifier 22. This produces a direct-current output, relative to a reference bias 22', that modifies the bias upon the control electrode 3 of the left-hand stage 1 of the trigger circuit. This modification, however, is still such as to maintain conduction of the left hand stage 1, though the change in conduction is sufficient to apply a voltage through $R_{11}$ to the control electrode 3' of the right-hand stage 1' that cuts the right-hand stage 1' off. The resulting rise in voltage at the anode or plate 5' of the stage 1' is applied by conductor 30 to diode resistors $R_1$ and $R_2$, reversing the bias conditions of all four diodes $D_1$, $D_1'$, $D_2$ and $D_2'$, rendering diodes $D_1'$ and $D_2'$ ineffective to conduct in the direction previously discussed, but rendering diodes $D_1$ and $D_2$ effective to conduct in the direction from resistors $R_6$ and $R_5$ toward resistors $R_2$ and $R_1$, respectively. The left and right stereo outputs resulting in conductors 14' and 14'' are thus applied, respectively, through coupling capacitors $C_2$ and $C_1$ to and through conductive diodes $D_2$ and $D_1$, and thus through respective coupling capacitors $C_2'$ and $C_1'$ to the left and right stereo outputs at respective output terminals 11 and 11'.

In view of the positive on or off switching action of the right-hand stage 1' of the trigger circuit 1–1', therefore, the diodes $D_1$, $D_2$, $D_1'$, $D_2'$ always receive either the correct positive or negative full bias voltages. They are thus positively switched, obviating the difficulties with prior-art direct current amplifier control of similar circuits of this character wherein intermediate values of bias voltage can be produced. It will be observed that the stage 1 is always conducting to some degree in the trigger circuit of the present invention, whereas the stage 1' is fully conducting in the case of the reception of monophonic signals and completely shut off in the case of stereophonic signal reception. It should also be mentioned that when the stage 1' cuts off, such that its plate voltage at 5' rises, a neon or other indicator device N, appropriately biased by resistor network $R_{13}$–$R_{14}$, tapped off the B+ supply, will illuminate, indicating that there has been automatic switching to the stereophonic program. Clearly other types of indicators may readily be used. Alternately, the indicator might be directly operated by the output of the synchronizing amplifier 16 which as before explained, becomes energized upon the reception of the stereophonic program signal.

Since the left-hand stage 1 of the trigger circuit 1–1' is always conducting, it permits a dual use of that stage, not only as part of the trigger circuit, but as a substantially linear amplifier for amplification of interstation noise in order to cause the diode switching circuit to keep the system in the monophonic connection during off-station tuning or when tuned to a very weak stereophonic station, where the poor signal-to-noise ratio would make listening enjoyment impossible. Thus, the output of the anode 5 of stage 1 may also be coupled through capacitor C6 and along conductor 31 to a noise rectifier 25 the direct-current output of which may serve to cut off the synchronizing amplifier 16 in conjunction with a reference bias source 16'. Any output at 18' that would be fed to the synchronizing rectifier 22 will be cut off, thereby maintaining the trigger circuit 1–1' in the monophonic mode or position. No program material, but only noise above all broadcast modulation frequencies resulting in the output of the filter 6 will be applied at 6' to the control electrode 3, so that upon advent of the process previously described, the trigger circuit 1–1' will be normally maintained in the monophonic mode or position with the tube 1 conducting and the tube 1' saturated or fully conducting. Upon tuning to a station having a sufficient signal-to-noise ratio, the output of the filter 6 will be accordingly reduced.

In order to prevent the system from switching over to the stereo mode if there is insufficient synchronizing signal, moreover, the reference bias 22 is adjusted such that the output of the synchronizing amplifier 16 will be larger than is required for minimum synchronization of the 38 kc. insert oscillator 20. Loss of synchronization, therefore, is automatically indicated by the switching of the trigger circuit 1–1' to the monophonic mode position.

It is not necessary that a separate set of switching diodes $D_1$, $D_2$, $D_1'$, $D_2'$ be employed for the purposes herein described since the conventional stereophonic demodulator circuits themselves embody two sets of reversely poled diodes that, in response to the output of the trigger circuit 1–1', as applied by the conductor 30, may serve the simultaneous function of acting as the switching diodes. In FIG. 2, therefore, a modification is shown, with those reference numerals that are common to FIG. 1 representing the same circuit components as in FIG.

1. The modified demodulator 14''' of FIG. 2 is of the type that merely reduces a monophonic signal in passing the same, but demodulates a stereophonic signal, as now described. The demodulator 14''' is of the series type in which the composite signal is fed through the filter 8 at 8'' and is transformer-coupled at T to the tuned circuit of the 38 kc. insert oscillator 20. With the oscillator 20 operating, the diodes $D_2$ and $D_2'$ (and, alternately, the diodes $D_1$ and $D_1'$) will conduct through respective resistors $R_2''''$, $R_2'''$, $R_1'''$ and $R_1''''$ and thereby demodulate the stereophonic signal in accordance with the principles discussed in my said article. This provides left and right stereo outputs at the terminals 11 and 11' through respective coupling capacitors $C_2'$ and $C_1'$. Proper separation of the signal is effected by providing an opposite poled composite signal along conductor 8''' that is applied through resistors $R_2'''''$ and $R_1'''''$ to the respective coupling capacitors $C_2'$ and $C_1'$, with the points of connection to those capacitors being returned through respective resistors $R_2''$ and $R_1''$ to the B+ terminal.

In stereophonic operation, as described in connection with the system of FIG. 1, the voltage along conductor 30 in the output of the trigger circuit 1–1' is of the same value as the B+ voltage and the oscillator 20 oscillates in normal fashion as above-described. No direct-current bias voltages are thus applied to any of the demodulator diodes $D_1$, $D_1'$, $D_2$ or $D_2'$.

In monophonic operation, however, the voltage at 30 will be reduced because the stage 1' of FIG. 1 is conducting a full saturation, so that a direct-current voltage is applied through resistor $R_7'$ to the center tap of the secondary winding of the transformer T which is applied across the diodes of the stereophonic demodulator 14''' to bias the same. Diodes $D_1'$ and $D_2'$ will be appropriately biased in the forward direction to feed the monophonic signal to the output terminals 11 and 11' while the oppositely poled diodes $D_1$ and $D_2$ are biased so as to be ineffective. The oscillator 20, moreover, will be cut off because the output at 30 is applied also through resistor $R_{17}$, with respect to the reference bias source 24, to effect such cutoff. No demodulation will therefore take place in the demodulator 14''' in the case of the monophonic signal apart from the detection that occurred in the original tuner 2'.

While the invention has been illustrated in connection with trigger circuits of the type involving positive feedback from cathode to cathode of electron tubes, it is to be understood that transistor stages and other trigger circuits than electron-tube stages may also be employed, if desired. The switching diodes, moreover, may also take the form of other types of switching devices of this character, the term "diode" being used generically to embrace switching devices that can conduct substantially more in one direction than in the other, upon appropriate bias conditions.

Further modifications will also occur to those skilled in the art and all such are considered to fall within the spirit and scope of the invention as defined in the appended claims.

What is claimed is:

1. Apparatus for automatically switching common pairs of output terminals to monophonic and stereophonic signal outputs, that comprises, a two operational state trigger circuit biased normally to occupy one predetermined state of operation, two reversely poled switching diode means connected to the said output terminals and biased so that one diode means only is normally effective, monophonic and stereophonic signal-receiving means, means for connecting the monophonic and stereophonic signal-receiving means to the diode means, means for maintaining the trigger circuit in the said predetermined state, means responsive to the output of the monophonic signal-receiving means for applying the monophonic signal output through the said one diode means to the said pairs of output terminals, means responsive to the output of the stereophonic signal-receiving means for modifying the bias of the said trigger circuit to switch the same to the other of the said two operational states, and means controlled by the switching to the said other state for changing the diode bias to render the said one diode means ineffective and the other diode means effective, and means for thereupon applying the stereophonic pair of received signals through the other effective diode means to the said pairs of output terminals.

2. Apparatus as claimed in claim 1 and in which each said diode means comprises a pair of diode switches.

3. Apparatus as claimed in claim 1 and in which the said trigger circuit comprises two stages biased with one stage normally conductive and the second stage normally fully conductive at substantially saturation, and the said bias-modifying means comprises means for modifying the bias on the said one stage to change its conduction but to maintain the said one stage in the conductive state while substantially cutting off the second stage.

4. Apparatus as claimed in claim 1 and in which indicator means is provided operative upon the switching of the trigger circuit state to indicate the switching of the diode means for stereophonic reception.

5. Apparatus as claimed in claim 1 and in which the second-named responsive means includes means controlled by a received pilot signal accompanying the stereophonic signals for producing a direct-current bias modifying signal for application to the said trigger circuit.

6. Apparatus as claimed in claim 5 and in which means is provided responsive to a noise signal indicative of inadequate stereophonic signal for eliminating the said direct-current bias-modifying signal, thereby returning the trigger circuit to its said one predetermined state.

7. Apparatus as claimed in claim 1 and in which the said receiving means is connected with a stereophonic diode demodulator circuit and the said diode means are shared in common with the said demodulator diode circuit.

References Cited by the Examiner

UNITED STATES PATENTS

| | | | |
|---|---|---|---|
| 3,070,662 | 12/1962 | Eilers | 170—15 |
| 3,175,041 | 3/1965 | Shottenfeld et al. | 179—15 |

DAVID G. REDINBAUGH, *Primary Examiner.*

ROBERT L. GRIFFIN, *Examiner.*